3,524,843
BASIC INDAZOLE CONTAINING
MONOAZO DYESTUFFS
Gilbert Victor Henri Kremer, Ermont, and Robert Frederic Michel Sureau, Enghien-les-Bains, France, assignors by mesne assignments, to Ugine Kuhlmann, Paris, France, a corporation of France
No Drawing. Filed Aug. 6, 1965, Ser. No. 477,969
Claims priority, application France, Aug. 14, 1964, 985,225
Int. Cl. C09d 29/38; D06p 1/02
U.S. Cl. 260—163           7 Claims

ABSTRACT OF THE DISCLOSURE

Light-fast dyestuffs of the general formula:

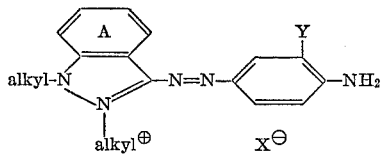

are formed by first condensing in an organic solvent a compound of the formula:

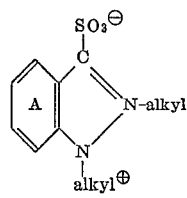

in which each of the alkyl groups is methyl or ethyl and the benzene nucleus A is substituted by hydrogen, chlorine, or nitro groups, with a phenylhydrazine of the formula:

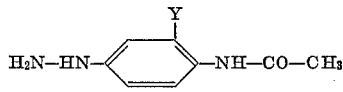

in which Y is hydrogen, chlorine or methyl group, oxidizing the hydrazone obtained as represented by:

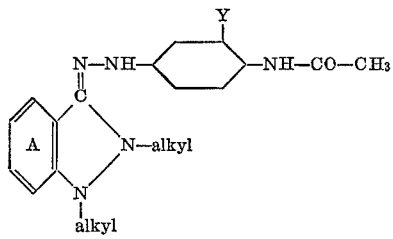

in an acid medium and thereafter deacylating.

---

The present invention concerns improvements in and relating to basic indazole dyestuffs.

According to the present invention dyestuffs are provided of general formula:

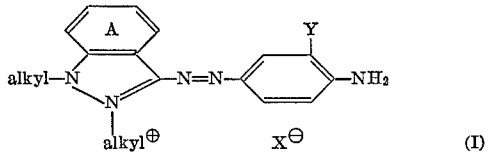

in which the nucleus A may be substituted by non-water-solubilising substituents such as for example halogen atoms or alkyl, alkoxy, nitro, cyano, alkylsulphonyl or sulphonamido groups, Y represents a hydrogen or chlorine atom or an alkyl group, X represents a monovalent anion and the alkyl groups in the 1 and 2 positions of the indazole nucleus may be the same or different.

The invention also includes a process for the preparation of the dyestuffs of Formula I which comprises hydrolysing in the hot, in aqueous solution containing mineral acid, a compound of the general formula:

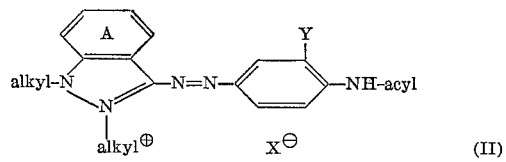

in which the possible substituents of the nucleus A and the significance of X and Y are the same as above, and the acyl group may be a formyl, benzoyl, phenylsulphonyl or, more particularly, an acetyl group.

The compounds of Formula II may be prepared for example by condensing in an organic solvent, which may contain water, a 1,2-dialkyl-3-indazolium-sulphobetaine of Formula III with a phenylhydrazine of Formula IV according to the following reaction:

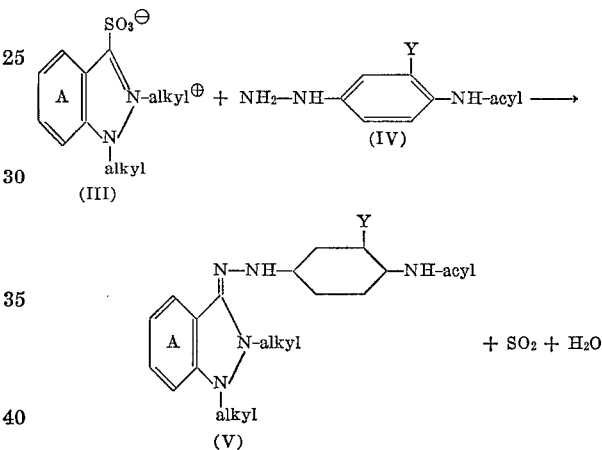

which reaction is followed by oxidation in an acid medium according to the scheme:

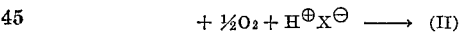

Amongst the solvents which may be used for the condensation reaction are, for example alcohols, pyridine bases, formamide, dimethyl formamide, dioxan, or ethyleneglycol. The reaction is carried out in the presence of acid binding agents such as for example alkali metal acetates, carbonates or bicarbonates, pyridine bases, triethylamine, triethanolamine or diethylethanolamine.

The oxidation may be effected in the same solvents as the condensation, a large variety of oxidising agents being suitable, for example; hydrogen peroxide, peracids such as peracetic acid, organic peroxides such as those of the ketones, mineral peroxides such as manganese dioxide, per-salts such as permanganates or persulphates, alkali metal chlorites or hypochlorites, ferric chloride or ferricyanides. The reaction mixture must be kept acid by the addition of mineral or organic acids.

The new dyestuffs of Formula I possess the tinctorial properties of basic dyestuffs and in particular, give to fibres based on polymers or copolymers of acrylonitrile bright, full-bodied, red shades having excellent general properties. Similar dyestuffs have been described in U.S. application Ser. No. 154,821 of Nov. 24, 1961 and now abandoned. The process of this co-pending application comprises condensing 1,2-dialkyl-3-indazolone-hydrazones with aniline derivatives in the presence of oxidising agents. However, this method is not practically applicable in the case of aniline owing to the poor coupling activity of this base and its sensitivity to oxidising agents. On the other hand in order to prepare the dyestuffs of Formula I, coupling the diazo derivative of 3-amino-indazole with aniline or its C-substituted derivatives, then quaternising the azo derivative thus obtained by means of an alkylating agent by a known method could be considered. In this case, however, the alkylation is effected solely or preferentially on the primary amino group.

Owing to the process of the present invention, the dyestuffs of Formula I are now readily obtainable with good yields.

In the following examples, which are purely illustrative and to which the invention is not limited, the parts are parts by weight unless the contrary is indicated.

EXAMPLE 1

5.2 parts of 5-chloro-1,2-dimethyl-3-indazolium-sulphobetaine are reacted with 4.3 parts of 4-acetylaminophenylhydrazine hydrochloride in 15 parts of α-picoline and 2.8 parts of triethylamine. The mixture is heated with stirring for 3 hours at 80° C. The reaction mixture is cooled to ordinary room temperature and diluted with 50 parts by volume of 15% brine and made acid with concentrated hydrochloric acid. The hydrazone formed is isolated by filtration, and washed on the filter with 50 parts of 15% brine.

The hydrazone is suspended in 100 parts of water acidified with 1 part of glacial acetic acid, the suspension is heated to 40° C. and 1.6 parts of commercial sodium chlorite dissolved in 20 parts of water are added over a period of 30 minutes. After stirring for half an hour at 30–40° C., the mixture is heated to boiling and filtered while hot. The cooled mother liquors are salted out with 20 parts of sodium chloride, and the dyestuff is precipitated. It is isolated by filtration and washed on the filter with 15% brine.

In order to hydrolyse the acylamino group, it is taken up in a solution of 10 parts by volume of concentrated hydrochloric acid in 20 parts of water and boiled for an hour. After cooling, one neutralises with sodium acetate and the precipitated dyestuff is separated by filtration. It is washed on the filter with 5% brine, and dried. 4.5 parts by weight of dyestuff are obtained, which dyes polyacrylic fibres a bright, scarlet shade which is very fast, especially to light.

The necessary sulphobetaine can be obtained in the following way: 260 parts of methyl sulphate are heated to 120° C. and 187 parts of 3,5-dichloro-indazole are added in small portions in a period of half an hour, and then heating is continued for an hour at 120–130° C. After cooling, the mixture is diluted with 1000 parts of water and neutralized with 225 parts of commercial trisodium phosphate. To the solution which has become clear and has been cooled to +10° C., 126 parts of anhydrous sodium sulphite are added in a period of 15 minutes. The mixture is stirred for an hour and the insoluble sulphobetaine is separated by filtration, and is washed with cold water on the filter and dried. 210 parts of 5-chloro-1,2-dimethyl-3-indazolium-sulphobetaine are obtained.

EXAMPLE 2

74 parts of 5,7-dichloro-1,2-dimethyl-3-indazolium-sulphobetaine are reacted with 51 parts of 4-acetylaminophenylhydrazine hydrochloride in 190 parts of dimethylformamide and 34 parts of diethylaminoethanol. The mixture is heated with stirring for 6 hours at 45° C. After cooling, it is diluted with 625 parts of 15% brine, the precipitated hydrazone is filtered off and washed on the filter with 300 parts of 15% brine.

The hydrazone is suspended in 1250 parts of water acidified with 12.5 parts of glacial acetic acid. The mixture is heated to 40° C. and 20 parts of commercial sodium chlorite dissolved in 250 parts of water are introduced therein.

After stirring the mixture for half an hour at 30–40° C. it is heated progressively to 95° C. 100 parts of salt are added to the solution and the precipitated dyestuff is filtered off in the cold.

In order to hydrolyse the acylamino group, the dyestuff is taken up in a solution of 250 parts by volume of concentrated hydrochloric acid in 500 parts of water, and is heated to boiling for an hour. After cooling, it is neutralised with sodium acetate. The dyestuff which is precipitated is isolated by filtration, washed on the filter with 5% brine and dried. 46 parts of dyestuff are obtained which dyes polyacrylic fibres a bright red shade having excellent general fastness.

EXAMPLE 3

5.4 parts of 5-nitro-1,2-dimethyl-3-indazolium-sulphobetaine are heated with 4 parts of 4-acetylaminephenylhydrazine hydrochloride for 4 hours at 45° C. in a mixture of 10 parts of dimethylformamide and 2.4 parts of diethylaminoethanol. The reaction mixture is diluted with 50 parts of 15% brine and the hydrazone is isolated by filtration. The product is washed on the filter with 50 parts of 15% brine and made into a paste in 100 parts of water and 2 parts of acetic acid. This is heated to 40° C. and 1.6 parts of commercial sodium chlorite dissolved in 10 parts of water are added progressively with stirring. After the introduction of the oxidising agent, stirring is continued for half an hour, and the mixture is then heated for a brief time at 100° C. The dyestuff precipitates on cooling, and is isolated by filtration and washed with 15% brine.

In order to hydrolyse the acylamino group, the yellow dyestuff obtained is taken up in a solution of 10 parts of concentrated hydrochloric acid in 20 parts of water. The solution is boiled for 30 minutes and, after cooling, neutralised with sodium acetate, the dyestuff which is precipitated is collected by filtration. It is washed on the filter with 5% brine and dried. 4.6 parts of dyestuff are obtained, which dyes polyacrylic fibres a bright ruby shade, which is very fast to light.

EXAMPLE 4

9 parts of 1,2-dimethyl-3-indazolium sulphobetaine are mixed with 8.1 parts of 4-acetylaminophenylhydrazine in 30 parts by volume of absolute alcohol and 8.4 parts of sodium bicarbonate. The fluid paste is heated with stirring for 16 hours at 80° C. The reaction mixture is diluted with 200 parts of water and acidified with 8 parts of acetic acid. It is then heated to 30–35° C. and 3.2 parts of sodium chlorite dissolved in 40 parts of water are added progressively over a period of 30 minutes. One hour after the end of the introduction of the oxidising agent, the mixture is gradually heated to 80° C. and the precipitation of the intermediate dyestuff is completed by salting out with 40 parts of sodium chloride. After cooling to ordinary room temperature, the precipitate is isolated by filtration and washed on the filter with 10 parts of 5% brine.

In order to hydrolyse the acylamino group, the precipitate is taken up in 15 parts of water and 20 parts by volume of concentrated hydrochloric acid. The mixture is heated at the boil for one hour, the insoluble part is removed by filtration in the hot, and the filtrate is salted out with 5 parts of sodium chloride, and the mineral acidity is then neutralised with 30 parts of crystalline sodium acetate. The precipitated dyestuff is isolated by filtration, washed on the filter with 5 parts of 15% brine and dried. 7.6 parts of dyestuff are obtained which dyes polyacrylic fibres a bright scarlet shade which has very good general fastness.

EXAMPLE 5

5.42 parts of 5-nitro-1,2-dimethyl-3-indazolium sulphobetaine, 3.47 parts of 4-acetylamino-3-methylphenylhydrazine hydrochloride and 3.4 parts of sodium bicarbonate are mixed in 25 parts of absolute alcohol. The mixture is stirred for 2 hours at 80° C. then diluted with 50 parts of 15% brine. The insoluble hydrazone is isolated by filtration and washed on the filter with 25 parts of 15% brine.

The hydrazone is suspended in 200 parts of water acidified with 3 parts of acetic acid, and the suspension is heated to 40° C. and 1.6 parts of sodium chlorite dissolved in 20 parts of water are progressively added. After stirring for one hour at 30–40° C. the mixture is heated to 90° C. and salted out with 20 parts of sodium chloride. It is left to cool, the intermediate dyestuff is separated by filtration and washed on the filter with 20 parts of 5% brine.

The dyestuff paste is suspended in 20 parts of concentrated hydrochloric acid diluted with its own volume of water. The mixture is heated at the boil for one hour, the mineral acidity is neutralised with 15 parts of crystalline sodium acetate, and it is left to cool. The dyestuff is isolated by filtration, washed on the filter with 10 parts of 5% brine, and dried. 7 parts of a dyestuff are obtained which dyes polyacrylic fibres a bluish red shade having very good general fastness.

The 4-acetylamino-3-methyl-phenylhydrazine hydrochloride used in this example can be prepared in the following way:

164 parts of 4-acetylamino-3-methyl-aniline are suspended in 220 parts of 22° Bé. hydrochloric acid and 1100 parts of water. The solution is cooled to 0° C. to +5° C. and 70 parts of sodium nitrite dissolved in 300 parts of water are progressively added. The temperature of the mixture is maintained at between 0° C. and +5° C. until the solution becomes clear. This solution is then run slowly into a solution of 130 parts of anhydrous sodium sulphite and 15 parts of caustic soda in 1500 parts of water. The diazosulphonate of yellow colour precipitates, and this precipitation is completed by the addition of 720 parts of sodium chloride. The precipitated diazosulphonate is isolated by filtration and dissolved in 520 parts of hot water. The solution obtained is acidified with 52 parts of acetic acid and heated to 70° C. Then 80 to 90 parts of zinc powder are added progressively while stirring vigorously. After heating for one hour at 70° C., the reduction is ended, the solution obtained being colourless. The zinc sludge is separated by filtration and washed several times with altogether 200 parts of boiling water. The filtrate and the washings are united and salted out with 200 parts of sodium chloride and cooled to +10° C. Sodium 4-acetylamino-3-methyl-phenylhydrazino-sulphonate precipitates, and is isolated by filtration and dried at 45–50° C.

The sodium 4-acetylamino-3-methyl-phenylhydrazino-sulphonate obtained is suspended with stirring in 450 parts of a 20% solution of sodium chloride acidified with 300 parts of 22° Bé. hydrochloric acid. Hydrolysis takes place at ordinary room temperature, and is completed at the end of 8 hours. The reaction mixture is then diluted with 400 parts of a 20% solution of sodium chloride and the 4-acetylamino-3-methyl-phenylhydrazine hydrochloride is collected on the filter. It is suspended in 500 parts of a 20% solution of sodium chloride in order to get rid of the residual acid. After stirring for two hours, the 4-acetylamino-3-methyl-phenylhydrazine hydrochloride is isolated by filtration and dried at 40–45° C.

EXAMPLE 6

5.9 parts of 5,7-dichloro-1,2-dimethyl-3-indazolium sulphobetaine and 4.75 parts of 3-chloro-4-acetylamino-phenylhydrazine hydrochloride are heated for 3 hours at 60° C. in 8 parts by volume of absolute ethanol and 3 parts by volume of diethylaminoethanol. After cooling, the mixture is diluted with 50 parts of 15% brine, filtered and the precipitated hydrazone is washed with 50 parts of 15% brine.

The drained hydrazone is suspended in 200 parts of water and 2 parts of acetic acid, and the suspension heated to 40° C. and a solution of 1.6 parts of commercial sodium chlorite in 20 parts of water is introduced while stirring over a period of about 30 minutes. The mixture is then stirred at 40° C. for a further 30 minutes, The temperature raised progressively to 95° C., and the mixture filtered hot. 20 parts of sodium chloride are added to the filtrate and it is left to cool, the dyestuff which is precipitated is filtered off and washed with 10% brine.

The precipitate is dissolved in 60 parts of water and 30 parts by volume of concentrated hydrochloric acid and boiled for one hour. It is neutralised with 50 parts of crystalline sodium acetate, left to cool, and the solid filtered off, washed with 5% brine, drained and dried. The dyestuff thus obtained dyes polyacrylic fibres a bright red shade having excellent general fastness.

The 3-chloro-4-acetylamino-phenylhydrazine hydrochloride used in this example may be prepared as follows:

A solution of 184.5 parts of 3-chloro-4-acetylamino-aniline in 500 parts of water and 200 parts by volume of concentrated hydrochloric acid is cooled to between 0° C. and 5° C. A solution of 70 parts of sodium nitrite in 100 parts of water is introduced with stirring. After half an hour the diazo solution is poured into a solution of 156 parts of anhydrous sodium sulphite in 600 parts of water containing 16 parts by volume of 10 N caustic soda and 110 parts of ice. The mixture is stirred for one hour and 200 parts of sodium chloride are added.

The precipitated diazosulphonate is filtered off and dissolved in 500 parts of water and 5 parts by volume of acetic acid. The solution is brought to the boil, 80 parts of zinc powder are added portionwise, and the mixture is heated until decolorisation takes place, and is then filtered and the filtrate is concentrated to dryness in vacuo. The dry residue is dissolved in 400 parts by volume of ethanol and 125 parts by volume of concentrated hydrochloric acid and the mixture is heated for 3 hours at 50° C. It is cooled to 10° C. and the precipitated 3-chloro-4-acetylamino-phenylhydrazine hydrochloride is filtered off, drained and dried under vacuum. 115 parts titrating 69% are thus obtained.

The following table summarises a few analogous examples.

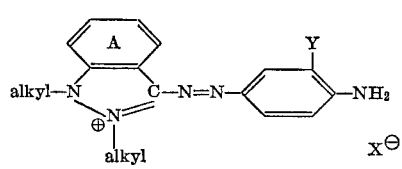

| Example: | Substituent of A | Y | Shade on polyacrylic fibres |
|---|---|---|---|
| 7 | | —chloro | Bright scarlet. |
| 8 | 5-chloro | do | Bright red. |
| 9 | 5-nitro | do | Ruby. |
| 10 | 6-nitro | do | Bright red. |

We claim:
1. A dyestuff of the formula:

in which each of the alkyl substituents of the indazole nucleus is a methyl or an ethyl group, the benzene nucleus A is substituted by hydrogen, chlorine or nitro group, Y is hydrogen, chlorine or the methyl group and X represents a monovalent anion.

2. Dyestuffs according to claim 1, in which the alkyl groups in the 1 and 2 positions of the indazole nucleus are identical.

3. The dyestuff of the formula:

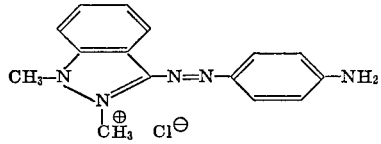

4. The dyestuff of the formula:

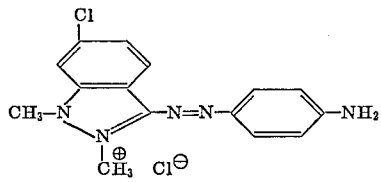

5. The dyestuff of the formula:

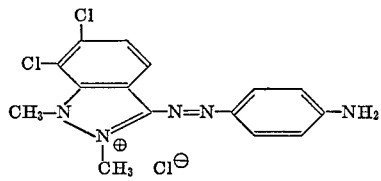

6. The dyestuff of the formula:

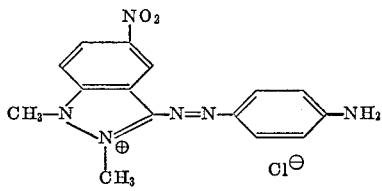

7. The dyestuff of the formula:

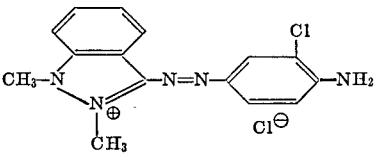

References Cited

UNITED STATES PATENTS

| | | | |
|---|---|---|---|
| 2,893,816 | 7/1959 | Tsang et al. | 260—155 X |
| 2,933,503 | 4/1960 | Clark et al. | 260—309.2 |
| 3,101,988 | 8/1963 | Bossard et al. | 260—163 X |

FOREIGN PATENTS

| | | |
|---|---|---|
| 1,291,557 | 3/1962 | France. |
| 1,337,224 | 8/1963 | France. |

CHARLES B. PARKER, Primary Examiner

D. M. PAPUGA, Assistant Examiner